(12) United States Patent
Arthur

(10) Patent No.: US 6,254,169 B1
(45) Date of Patent: Jul. 3, 2001

(54) PICKUP TRUCK BED COVER

(76) Inventor: Jim Arthur, 7949 Winston Rd., Philadelphia, PA (US) 19128

( * ) Notice: Subject to any disclaimer, the term of this patent is extended or adjusted under 35 U.S.C. 154(b) by 0 days.

(21) Appl. No.: 09/215,242

(22) Filed: Dec. 18, 1998

(51) Int. Cl.[7] .................................................. B60P 7/02
(52) U.S. Cl. .............................. 296/100.07; 296/100.04; 296/100.06
(58) Field of Search ............................. 296/37.6, 100.06, 296/100.07, 100.04

(56) References Cited

U.S. PATENT DOCUMENTS

| | | | |
|---|---|---|---|
| Re. 33,790 | 1/1992 | Huber | 296/100 |
| 3,069,199 | * 12/1962 | Reardon et al. | 296/100.07 |
| 4,124,247 | 11/1978 | Penner | 296/100 |
| 4,199,188 | 4/1980 | Albrecht et al. | 296/100 |
| 4,284,303 | 8/1981 | Hather | 296/100 |
| 4,406,493 | 9/1983 | Albrecht et al. | 296/100 |
| 4,469,364 | * 9/1984 | Rafi-Zadeh | 296/37.6 |
| 4,531,775 | 7/1985 | Beals | 296/100 |
| 4,695,083 | 9/1987 | Herrmeyer | 292/241 |
| 4,832,394 | 5/1989 | Macomber | 296/100 |
| 4,861,092 | 8/1989 | Bogard | 296/100 |
| 4,991,271 | 2/1991 | Bauer et al. | 24/590 |
| 5,009,457 | 4/1991 | Hall | 296/3 |
| 5,013,078 | 5/1991 | Eckerd et al. | 296/100 |
| 5,110,021 | * 5/1992 | Dawson, Jr. | 296/100.1 X |
| 5,183,309 | 2/1993 | Jordan | 296/100 |
| 5,209,543 | 5/1993 | Harkins, Jr. | 296/100 |
| 5,322,336 | 6/1994 | Isler | 296/100 |
| 5,503,450 | 4/1996 | Miller | 296/100 |
| 5,636,893 | 6/1997 | Wheatley et al. | 296/100 |
| 5,743,586 | 4/1998 | Nett | 296/100 |
| 5,782,522 | 7/1998 | DeBono | 296/100 |

* cited by examiner

Primary Examiner—D. Glenn Dayoan
Assistant Examiner—Jason Morrow
(74) Attorney, Agent, or Firm—Sofer & Haroun, LLP

(57) ABSTRACT

A removable cover system for use on a pickup truck bed, the bed having a floor, side walls, a front wall, and a tailgate. The cover comprises a frame having a front member, a rear member, and two side members. Members of the frame are attached to the bed at the upper surfaces of the side wall and front wall. Additionally, a captive lid and a restraining lid are provided. The captive lid and the restraining lid each have a front edge, a rear edge, an outboard edge, an inboard edge, a top side, and a bottom side. A plurality of receiving members are disposed on the side members of the frame. A plurality of pin members are disposed on the outboard edge of both the captive lid and the restraining lid. In one embodiment, an alignment system is provided. The system incorporates grooves on the side members of the frame and on the lids. The grooves guide the pins into the receiving members thus allowing the lids to be rotatably connected to the side members of the frame.

33 Claims, 9 Drawing Sheets

PICKUP TRUCK BED COVER

FIELD OF THE INVENTION

This invention relates to a covering for the bed portion of a pickup truck or other similar vehicle.

BACKGROUND OF THE INVENTION

Pickup trucks constitute a large number of vehicles on the road today. They are popular because of their ability to haul sizable loads and because they allow easy access to items in their beds. Having an open bed, pickup trucks can haul items that may be too large to fit in other vehicle types. However, the open bed also may constitute a liability. One problem is that the owner of a pickup may want to take advantage of the bed in a manner that requires security or protection from the elements. By definition, the pickup truck has an open bed which can be accessed by anyone or anything. Also, the open bed of a pickup truck is known to create a sizable drag force on the vehicle when it is traveling. This drag force impinges on the fuel consumption of the vehicle. Each of these liabilities may be overcome by properly covering the bed of the pickup truck.

At the same time, a covered pickup truck bed may interfere with a pickup owner's ability to exploit all pickup truck's qualities. Thus, the aforementioned advantages of a covered pickup bed may be outweighed by the owner's need to use the pickup with the open bed. In order that the ability to haul large loads and easy access be preserved, a pickup truck cover must be easily openable and removable.

There are many examples of pickup truck bed covers in the prior art. Most of these designs strive to allow the user easy access to the compartment that is formed when the cover is installed. Additionally, designs typically boast that a cover is easily removable from the pickup truck. Some designs also include the ability to configure the cover such that it extends the bed walls of the pickup to a higher height. However, easy access and easy removal are not often actual qualities of the prior art. Also, designs do not have a system to prevent the damaging effects caused by vibrations.

U.S. Pat. No. 4,284,303 discloses a pickup truck bed cover that comprises two side-by-side elongated cover sections. Barrel hinge structures are spaced along the edges of the cover to releaseably secure the cover to the pickup truck. The hinge structures include axially shiftable hinge pins as opposed to rotatable hinge pins. The aforementioned hinge assemblies prove to be cumbersome in operation. Before securing the covers to the truck, each assembly must be painstakingly aligned. Thus, this cover lacks an arrangement that allows the cover to be more easily installed and removed.

U.S. Pat. No. 4,832,394 discloses a pickup truck bed cover system that includes a hinge assembly for pivotally and removably connecting at least one cover panel member to a pickup truck bed. The subject hinge assembly comprises hinge support means attached to the truck for pivotally connecting each of the cover members to the truck. This cover does not allow for unobstructed access to the bed. Additionally, the cover lacks an arrangement that allows the cover to be more easily installed and removed.

U.S. Pat. No. 5,009,457 discloses a pickup truck cover that can be locked to the bed of a vehicle to provide storage of items and may also be raised into a position whereby the walls of the bed are extended in height. However, this apparatus lacks an arrangement that allows the cover to be easily installed and removed. This cover also lacks seals and a system to easily raise and lower the cover.

U.S. Pat. No. 5,183,309 discloses a cover having three rectangular panels arranged along the top of a pickup truck bed. The center panel is fixed and the side panels are pivotally attached to the center panel. A flange overlaps the top surfaces of the bed providing support for the cover. This cover does not allow complete access to the bed. Additionally, the cover lacks an arrangement that allows the cover to be more easily installed and removed.

U.S. Pat. No. 5,782,522 discloses a removable cover for a pickup truck bed comprising two panels that are hingedly attached to each other at their inside edge along the hinge connection. A securing means secures the outer edge of each panel to the side wall. This cover is difficult to install and remove by one person.

It is therefore the object of this invention to provide a pickup truck cover that protects the contents in the bed of a truck while being easily removable from a truck by one person.

SUMMARY OF THE INVENTION

It is a general objective of this invention to provide a removable cover for use with a pickup truck cover.

It is a more specific objective to provide a removable cover that has the ability to align itself when being installed on the bed of a pickup truck.

It is a more specific objective of this invention to provide a cover that is self adjusting. Namely, the cover lids are free to move fore and aft in relation to the bed, and one another, while securely staying in the closed position.

It is yet another objective of this invention to provide a stiff cover that is light in weight.

It is another objective of this invention to provide a removable cover with central gas struts that provide suspension for the cover.

It is yet another objective of this invention to provide a removable cover with a latching mechanism and seal system that incorporates the suspension characteristics of the gas struts.

It is another objective of this invention to provide a removable cover with integral hardpoints for attachment of racks and the like.

In one embodiment of the invention, a removable cover is presented for use on a pickup truck bed; the bed having a floor, side walls, a front wall, and a tailgate. The cover comprises a frame having a front member, a rear member, and two side members. Members of the frame are attached to the bed at the upper surfaces of the front and side walls. Additionally, lids are provided. Each lid has a front edge, a rear edge, an outboard edge, an inboard edge, a top side, and a bottom side. A plurality of receiving members are disposed on the side members of the frame. A plurality of pin members are disposed on the outboard edge of the lids. In one embodiment, an alignment system is provided. The system incorporates grooves on the side members of the frame and grooves on the lids of the cover. The grooves guide the pins into the receiving members thus allowing the lids to be rotatably connected to the side members of the frame.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1A:
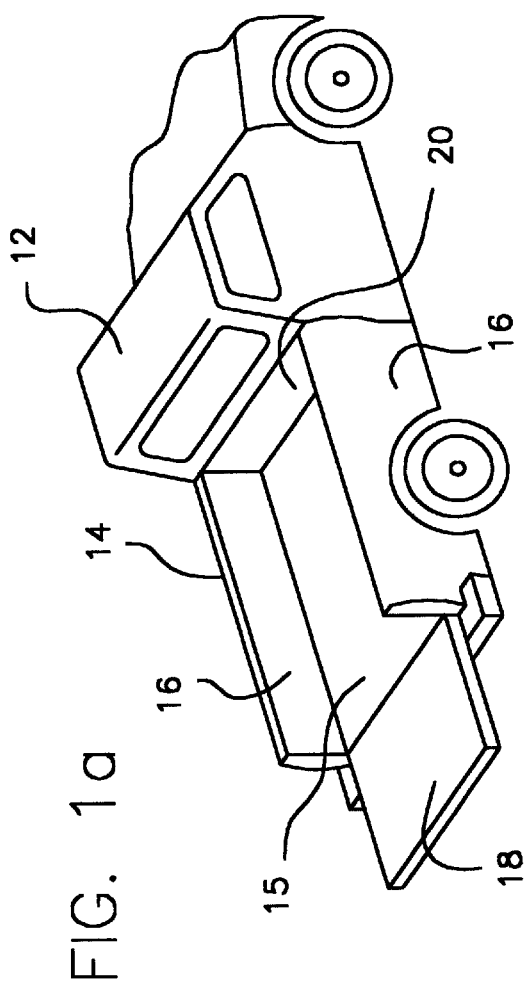
FIG. 1a is a perspective view of a pickup truck without a cover.
Figure 1C:
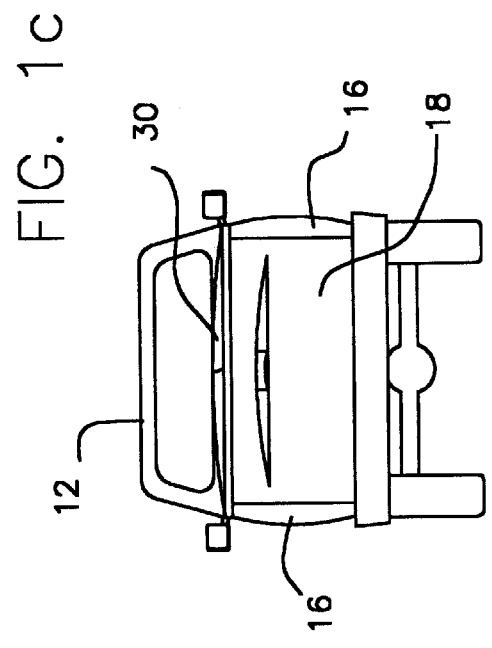
FIG. 1c is a rear view of a pickup truck with a cover.
Figure 1B:
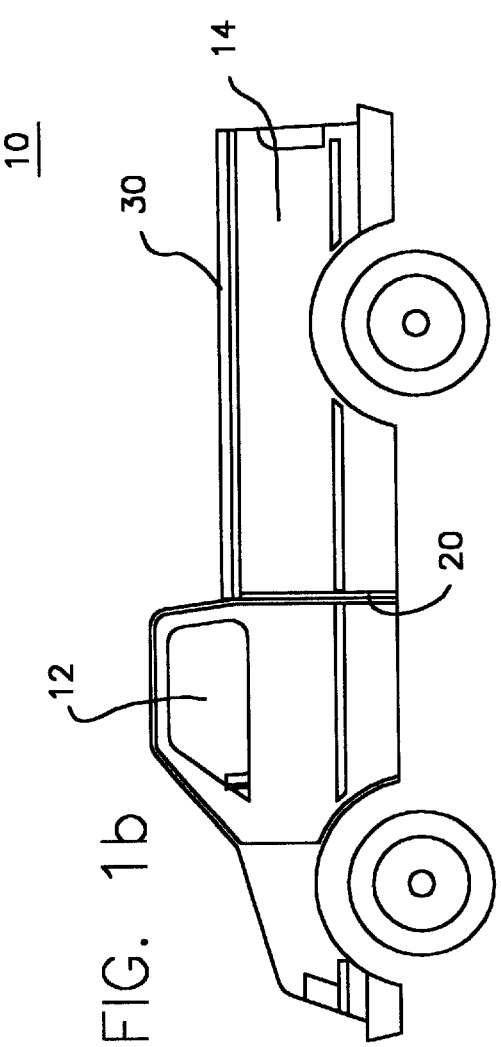
FIG. 1b is a side view of a pickup truck with a cover.

FIG. 1a is an illustration of a typical pickup truck 10 without a cover. Truck 10 is, at its most basic level, comprised of a cab 12 and a bed 14. Bed 14 is enclosed by side walls 16, a front wall 20, and a tailgate 18, all of which are attached to a floor 15. Tailgate 18 may be pivotally connected to floor 15. Pictured in FIGS. 1b and 1c is pickup truck 10 with a cover 30 in its closed position, in accordance with one embodiment of the invention.

Figure 2:
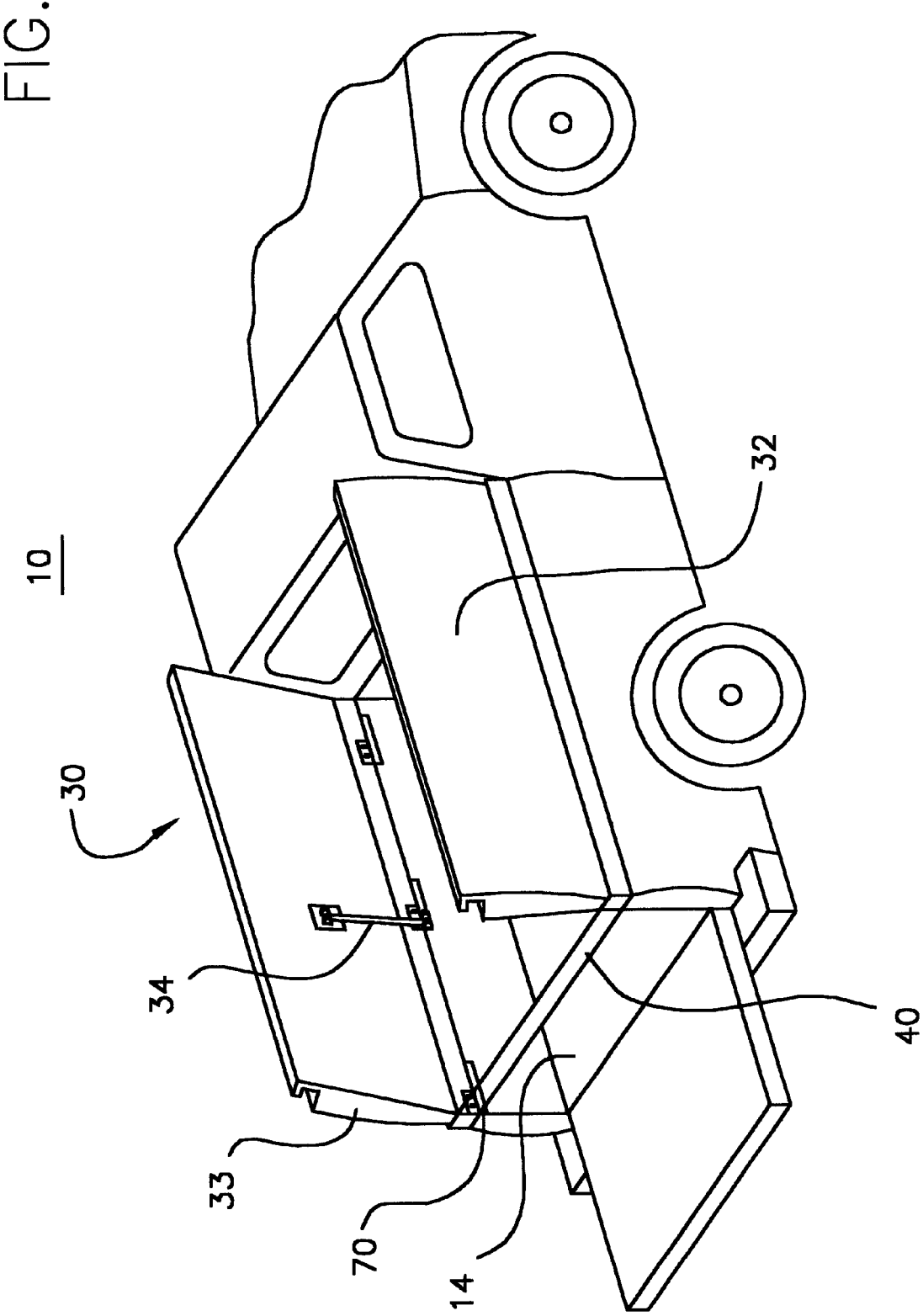
FIG. 2 is a perspective view of a pickup truck with a cover in an open position.

FIG. 2 illustrates the general configuration of cover 30 in relation to truck 10. In brief, cover 30 includes a frame 40, a captive lid 33, a restraining lid 32, and gas struts 34. Frame 40 is attached to bed 14 along the top surfaces of sidewalls 16 and front wall 20. In turn, captive lid 33 and restraining lid 32 are removably attached to frame 40, via hinge members, as explained in more detail below.

Figure 3:
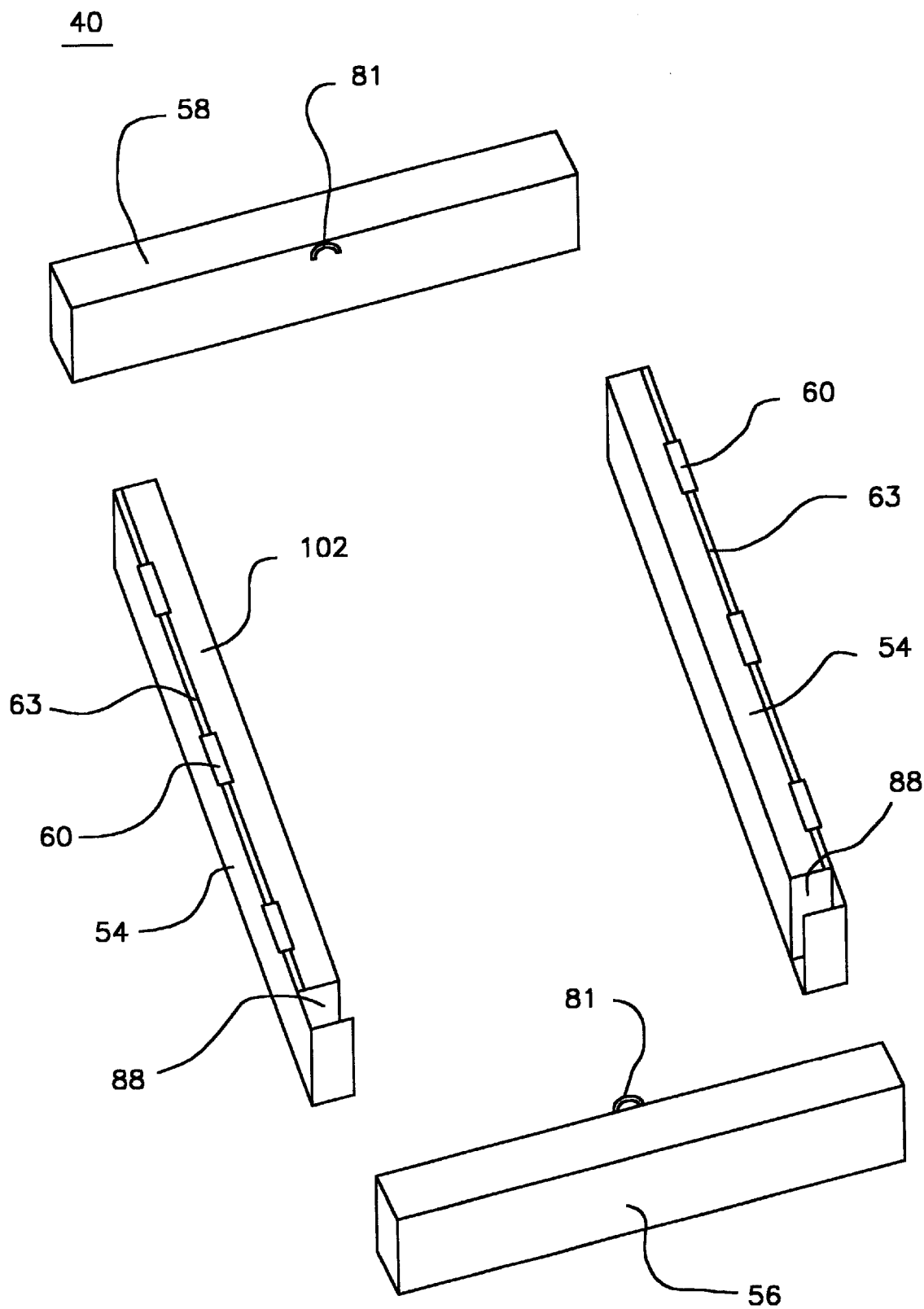
FIG. 3 is an exploded, perspective view of a frame.

Turning now in more detail to FIG. 3, frame 40 has a front member 58, a rear member 56, and two side members 54. Frame 40 is preferably fabricated from a strong, relatively light-weight metal such as aluminum. Members 56 and 58 preferably have a rectangular cross section. Side members 54 have a custom cross section that is designed to approximate the curve of the top portion of sidewalls 16. Each member 54, 56, and 58 are preferably created by an extrusion process. When assembled, frame 40 preferably forms a rectangular shape. Side members 54 constitute one pair of parallel sides; front member 58 and rear member 56 constitute another pair of parallel sides. In one embodiment of the invention, all four members of frame 40 are employed, although the invention is not limited in scope in that respect. For example, in accordance with another embodiment of the invention, frame 40 employs one or two side members 54.

In the preferred embodiment, pin grooves 63 are disposed along the top surfaces of side members 54. Pin grooves 63 are advantageously extended along the longitudinal length of each side member 54. As will be explained in more detail, each pin groove 63 is configured to act as a channel that guides the lids 32 and 33 along the corresponding frame member when a user intends to install the pick-up truck cover. However, the invention is not limited in scope in that respect. For example, pin grooves 63, instead of extending over the entire length of the corresponding frame member, are configured to extend over a portion of a frame member proximate to the location of hinge receiving members 60.

Also in the preferred embodiment, the rear ends of side members 54 have slots 88 which are capable of receiving the ends of rear member 56. Side members 54 also include a plurality of hinge receiving members 60 disposed axially along the lengths of side members 54. Hinge receiving members 60 are barrel-shaped and hollow so as to form a tube-like opening. In one embodiment, each side member 54 has three hinge receiving members 60. In such an embodiment, one hinge receiving member 60 is attached to side members 54 near rear member 56, one hinge receiving member 60 is attached to the center points of side members 54, and one hinge receiving member 60 is attached to side members 54 near front member 58. Hinge receiving members 60 are attached to side members 54 with an integral attachment plates. In one embodiment, these plates are held to the frame by bolts. In another embodiment, attachment plates are omitted. Instead, hinge receiving members 60 are attached directly into pin grooves 63.

Side members 54 are designed in such a way as to minimize unappealing appearance and any interference with normal use of pick up truck 10 without cover 30 in place. This is accomplished by providing slender side members 54 which projects a relatively small height from the upper surface of side walls 16. Integral curbs 102 are included on the inboard sides of side members 54. Curbs 102 serve at least two functions. When cover 30 is fully assembled, curbs 102 enhance the weather seal between lids 32, 33 and frame 40. Additionally, curbs 102 provide a slightly elevated bearing surface along the entire lengths of side members 54 to protect receiving members 60 and to provide a surface for supporting cargo larger than the truck bed.

Figure 4:
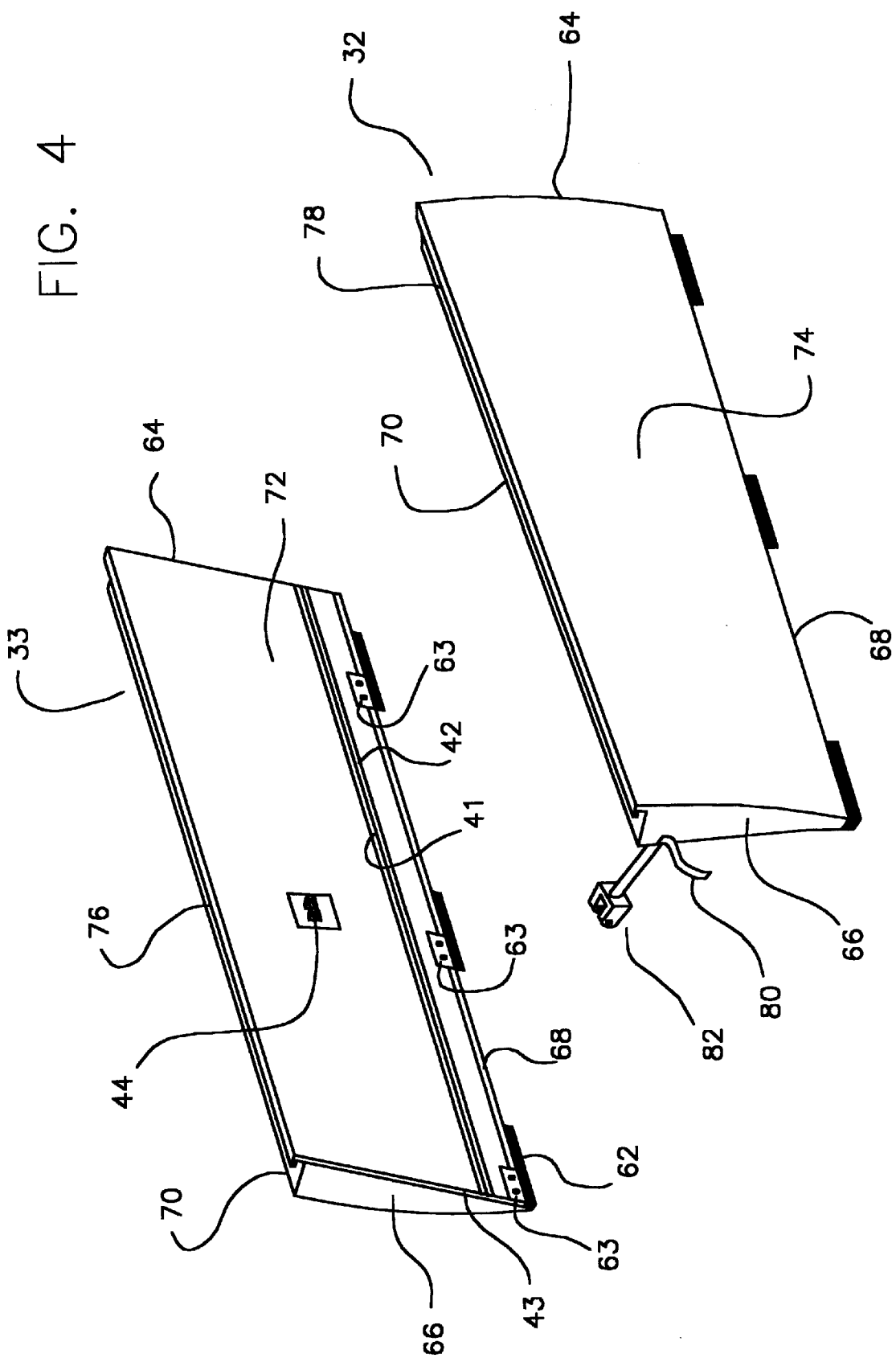
FIG. 4 is a perspective view of a restraining and captive lids.

Referring now to FIG. 4, restraining lid 32 and captive lid 33 are shown. Lids 32 and 33 are preferably fabricated from composite materials in a monocoque configuration. Lids 32 and 33 are generally identical in structure apart from important distinctions discussed below. Preferably, each lid 32 and 33 is generally rectangular in shape having a tapering front edge 64, a tapering rear edge 66, an outboard edge 68, and an inboard edge 70. Moreover, lids 32 and 33 have a bottom side 72 and top side 74.

In the preferred embodiment, top side 74 and bottom side 72, of lids 32 and 33, near inboard edges 70, are three to four inches apart; top side 74 and bottom side 72, of lids 32 and 33, near outboard edges 68, are one to two inches apart. Thus, placed on a level surface, both top sides 74 of lids 32 and 33 are pitched downward towards outboard edges 70. In turn, water and the like is encouraged to flow off top sides 74 of lids 32 and 33 towards outboard edges 68. To further promote proper drainage, top sides 74 of lids 32 and 33 are appropriately curved as well.

Figure 5:
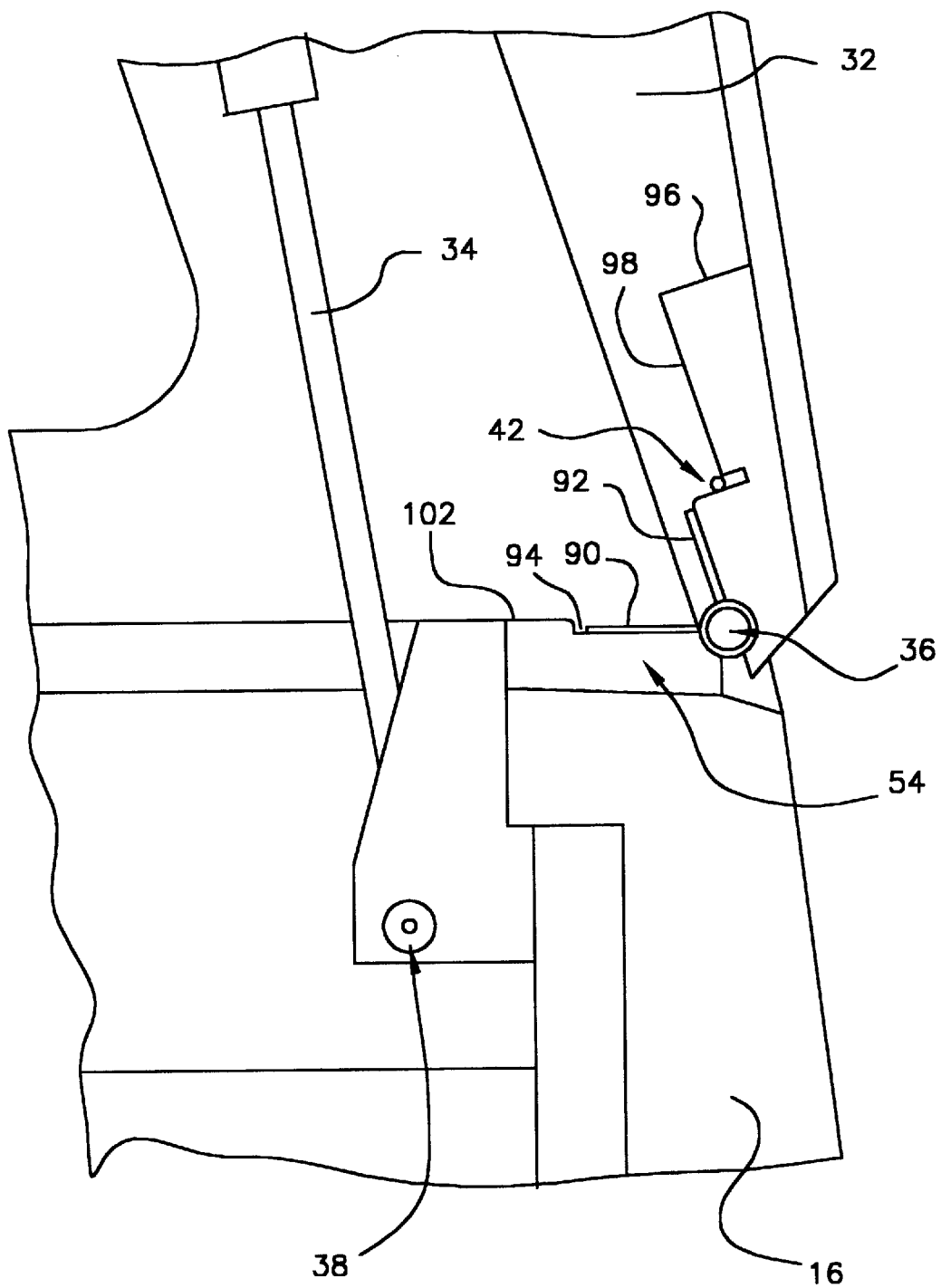
FIG. 5 is an expanded, partially broken away rear view of a hinge and frame with a cover in an open position.

With continued reference to FIG. 4, and with additional reference to FIG. 5, further details of lids 32 and 33 may be described. Such that water and the like cannot enter the bed through outboard edges 68, channels 41 preferably run the length of lids 32 and 33 along bottom sides 72 near outboard edges 68. Within the channels are disposed O-ring gaskets 42. Likewise, an O-ring 43 is preferably extends along bottom sides 72 of lids 32 and 33 near edge 66 corresponding to tailgate 18. O-ring 43 is also disposed within channels that are provided on bottom sides 72 of lids 32 and 33. When lids 32 and 33 are closed, O-rings 42 compress against side members 54 and O-rings 43 compress against tailgate 18 to form a seal. It should be noted that in one embodiment, O-rings 42 and 43 may be replaced by custom extruded elastomeric gaskets or other appropriate materials. Front edge 64 prevents water and the like from entering bed 14 without the use of an O-ring. Instead, front edge 64 extends forward, creating a lip, which overhangs front member 58 and front wall 20. In combination, these features serve to prevent water and the like from entering bed 14 through edges 64, 66, and 68.

Figure 6:
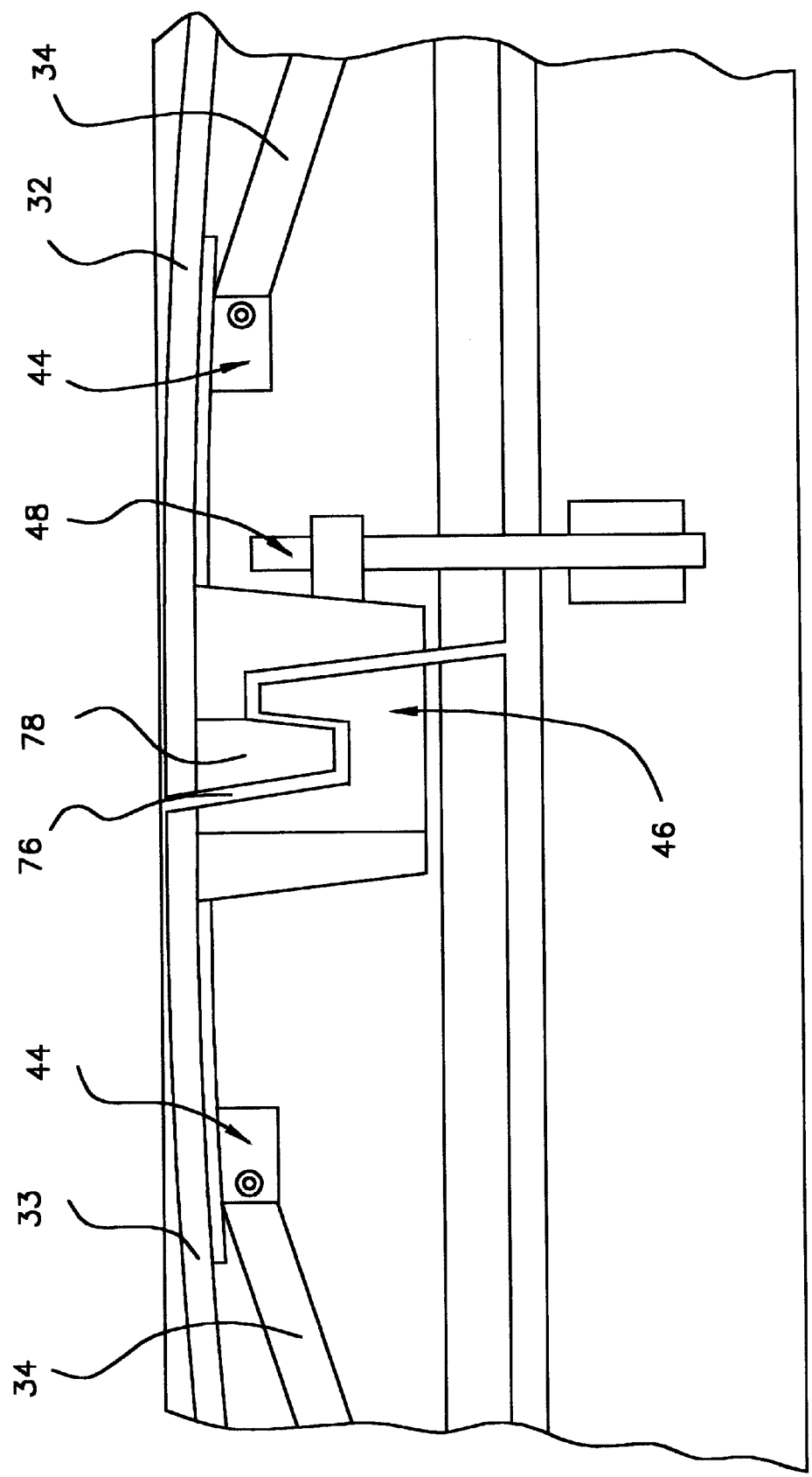
FIG. 6 is an expanded, partially broken away rear view of the center portion of a cover in a closed position.

Restraining lid 32 and captive lid 33 both include additional features which allow lids 32 and 33 to be securely and yet flexibly mounted on frame 40. Both lids 32 and 33 preferably have a strut mounting point 44 on bottom sides 72. Strut mounting points 44 serve to allow gas struts 34 to be mounted to lids 32 and 33 (as can be seen in FIGS. 2 and 6). In one embodiment, mounting points 44 are quick release fixtures which allow gas struts to be easily installed or removed from lids 32 and 33. Additionally, lids 32 and 33 include a plurality of hinge pin members 62 disposed axially along outboard edges 68 via support plates 63. Hinge pin members 62 are cylindrically shaped objects capable of entering and fitting securely within hinge receiving members 60. Hinge pin members 62 preferably have a tapered point on their extremes unfettered ends. Preferably, half the length of each hinge pin member 60 is surrounded by a barrel shaped object that includes an integral mounting plate. In one embodiment, both lids 32 and 33 have three pin members 60 which correspond to three hinge receiving members 60 on side members 54.

With continued reference to FIG. 4 and now also turning to FIG. 6, restraining lid 32 and captive lid 33 differ from one another in at least two respects. Together lids 32 and 33 are designed to engage one another at their inboard edges 70 to form a seal. To accomplish this, a captive channel 76 is configured to extend longitudinally along the length of the top side 74 of captive lid 33, near inboard edge 70. Corresponding to captive channel 76, a restraining rim 78 is configured to extend longitudinally along the length of bottom side 72 of restraining lid 32, near inboard edge 70. Captive channel 76 and restraining rim 78 both run the entire length of lids 32 and 33. Restraining lid 32 overlaps captive lid 33 when lids 32 and 33 are in a closed position. The overlap allows restraining rim 78 of restraining lid 32 to engage captive channel 76 of the captive lid 33. This engagement serves at least two purposes. First, a seal is formed between lids 32 and 33 that helps to keep water and the like out of bed compartment 14. This seal may be improved by lining captive channel 76, restraining rim 78, or both, with a gasket fabricated from rubber or a similar material. Alternatively, overlapping portions may be entirely fabricated from a custom extrusion of elastomeric material. Another purpose for the engagement is to allow restraining lid 32 to restrain captive lid 33 in the closed position.

Figure 7:
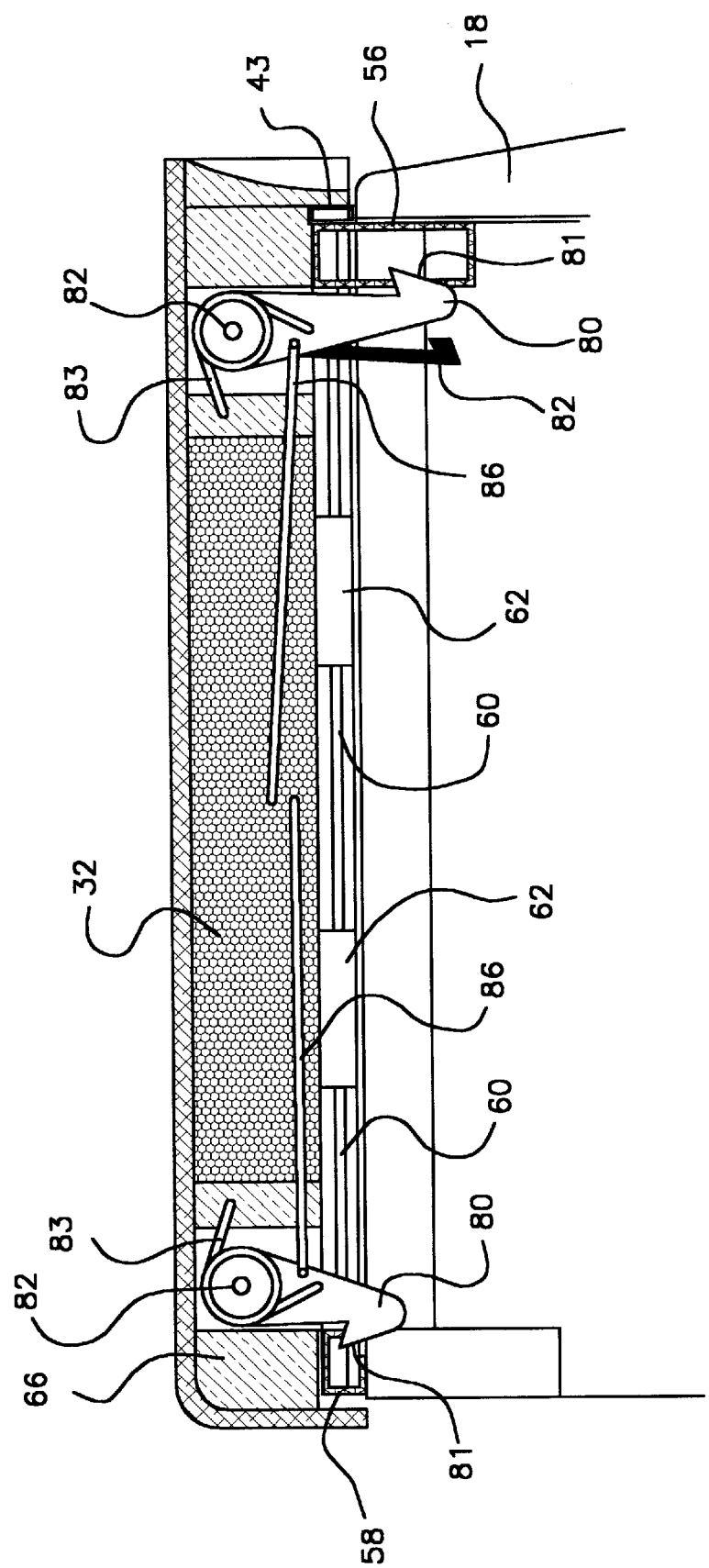
FIG. 7 is a perspective view of an alternate embodiment of a pickup truck with a cover consisting of a single lid in an open position.

Referring to FIG. 7, another difference between restraining lid 32 and captive lid 33 is that restraining lid 32 preferably includes a latching system. In accordance with one embodiment of the invention, the latching system includes a plurality of catch hooks 80 fixed on front edge 64 and rear edge 66 of restraining lid 32. The hooks are rotatable about catch pivot point 82 and biased towards one position. In one embodiment, the bias is accomplished through the use of springs 83. In a biased position hooks 80 fasten into corresponding catches 81 that are disposed on the rear member 56 and the front member 58. In the preferred embodiment, the latch mechanism includes a release handle 82 which is remotely connected to hooks 80. In one embodiment remote connection is accomplished by means of a linkage disposed with lid 32. Through the linkage 86, proper movement of the release arm forces hooks 80 into their unbiased position. In an unbiased position, hooks 80 no longer interfere with front member 58 and rear member 56. As hooks 80 are released from their respective catches 81, the upward force on restraining lid 32 caused by gas strut 34 begins to push restraining lid 32 to its open position. As restraining lid 32 moves towards an open position, captive channel 76 and restraining rim 78 disengage allowing captive lid 33 to be forced to its open position by gas strut 34.

Figure 8:
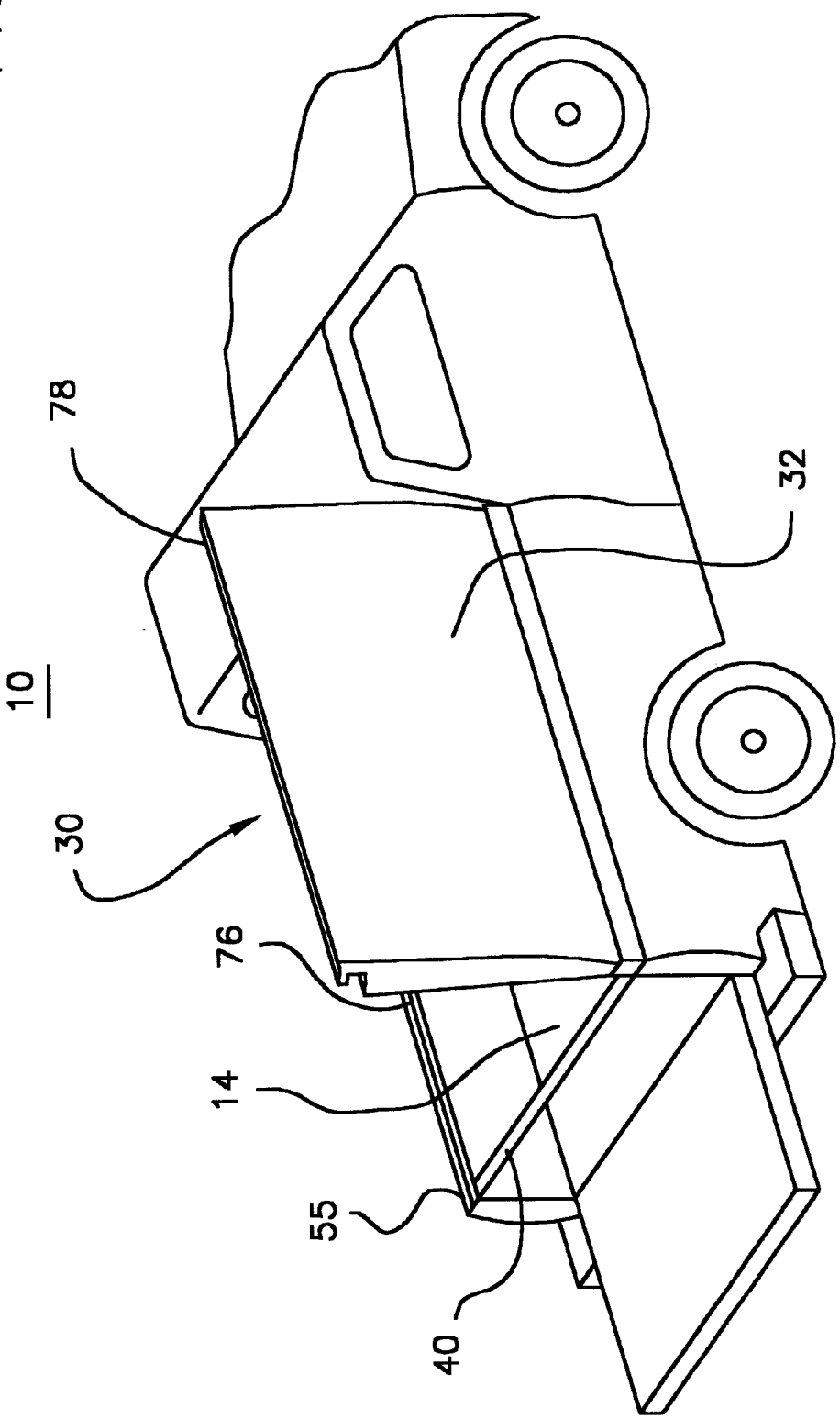
FIG. 8 is a sectional view of a restraining lid in the closed position.

Turning now to FIG. 8, another embodiment of the pickup truck cover system is shown. In this embodiment restraining lid 32 covers the entire bed 14. A captive channel 76 is disposed along captive side member 55. Thus restraining rim 78 engages captive channel 76 when restraining lid 32 is in the closed position.

With reference to the drawings and above description, operation of pickup truck cover 30 is illustrated. Installation of cover 30 begins with the one-time task of installing side members 54 of frame 40 to the upper surfaces of side walls 16 and front member 58 on front wall 20. This is accomplished with the use of threaded bolts or other similar attachment means (not shown). Preferably, side members 54 and front member 58 remain attached to walls 16 and 20 respectively, whether or not cover 30 is in use.

Restraining lid 32 and captive lid 33 are installed as explained hereinafter. For purposes of this explanation, installation of captive lid 33 is presented. To begin, the outboard edge of captive lid 33 is placed in a vertical position on side member 54. Hinge pin members 62 along with edge 68 engage pin groove 63 disposed along the length of side members 54. Pin groove 63 and restraining groove 61 acts as a guiding channel that allows for captive lid 33 to freely slide along side members 54 in a pre-determined straight-line fashion. Likewise, receiving members 60 engage receiving groove 61 disposed along lids 33.

It is the track-like system that is provided by pin groove 63 and receiving groove 61 that allows captive lid 33 to be properly and conveniently aligned. By sliding captive lid 33 towards front wall 20 of bed 14, corresponding hinge pins 62 engage the hinge receiving members 60. In conjunction, pins 62 and hinge receiving members 60 form a simple hinge. There are a plurality of hinges which are comprised of corresponding pin members 62 and hinge receiving members 60. Thus, each hinge pin member 62 must rest on side member 54 in a position immediately preceding its corresponding hinge receiving member 60. Captive lid 33 may now be rotated about a longitudinal axis extended in parallel to side member 54.

In a preferred embodiment, gas strut 34 is installed after pins 62 on captive lid 33 have properly engaged hinge receiving members 60 of side members 54. One end of gas strut 34 is attached to strut attachment 38. In one embodiment, strut attachment 38 is disposed on the center of side member 54. The other end of strut 34 is attached to bottom side 72 of captive lid 33 where strut mounting point 44 is disposed. In one embodiment, clevis pins are used to attach strut 34 to strut attachment 38 and strut mounting point 44. Gas struts 34 are preferably self-damping and self-limiting compression springs that stop lids 32 and 33 from over-extending in the open position.

After attaching restraining lid 32 in the same way, both captive lid 33 and restraining lid 32 are kept in the open position. Rear frame member 56 is placed in slot 88 provided at the rear ends of side members 54. Likewise, front frame member 58 is placed in slots 88 provided at the front ends of side members 54. It is noted that front and rear frame may also be installed prior to installing lids 32 and 33.

Lids 32 and 33 can now be placed in a locked position to enclose bed 14. In order for lids 32 and 33 to properly engage one another and form a seal, captive lid 33 must be placed in its closed position before restraining lid 32 is placed in its closed position. Hooks 80 on restraining lid are biased towards their locked position. As restraining lid 32 is closed, hooks 80 pass catches 81 on the front and rear frame members. Hooks 80 interfere with catches 81, rotating pivotally such that they may pass catches 81. Upon passing catches 81, hooks 80 move back to their biased, locked position. While gas strut 34 of the retraining lid places an upward force on restraining lid 32, hooks 80 serve to counter the force, holding the lid in the closed position. Moreover, while gas strut 34 of captive lid 33 places an upward force on captive lid 33, the engagement of the channel of captive lid 33 and the rim of restraining lid 32 serves to counter the force, holding the lid in the closed position.

At this point, tailgate 18 is closed. When tailgate 18 is closed, access is denied to the interior of bed 14. Because latch release handle 82 is on bottom side 72 of restraining lid 32, it cannot be reached unless tailgate 18 is opened. Any locking mechanism on tailgate 18 serves to additionally lock the cover.

The latch system, in conjunction with gas struts 34, serve another function. The constant upward force caused by struts 34, as explained above, allows cover 30 to float atop bed 14. Preferably, most of the weight of cover 30, if not all, is supported by struts 34. Struts 34 act as dampers improving the wearablity of cover 30. By absorbing vibrations, cover 30 and frame 40 are less prone to damage.

Figure 9B:
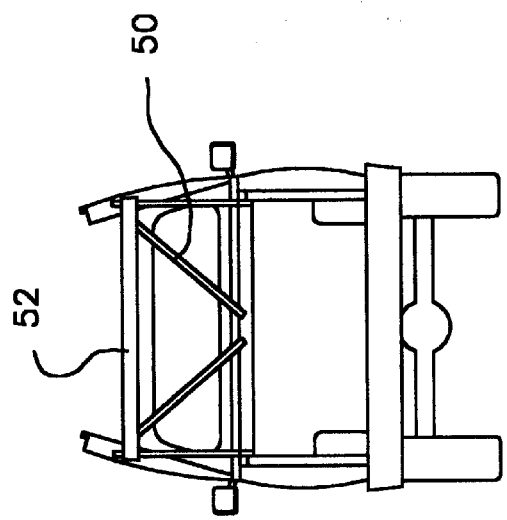
FIG. 9b is a rear view of a pickup truck with a cover rigged for driving in an open position.
Figure 9A:
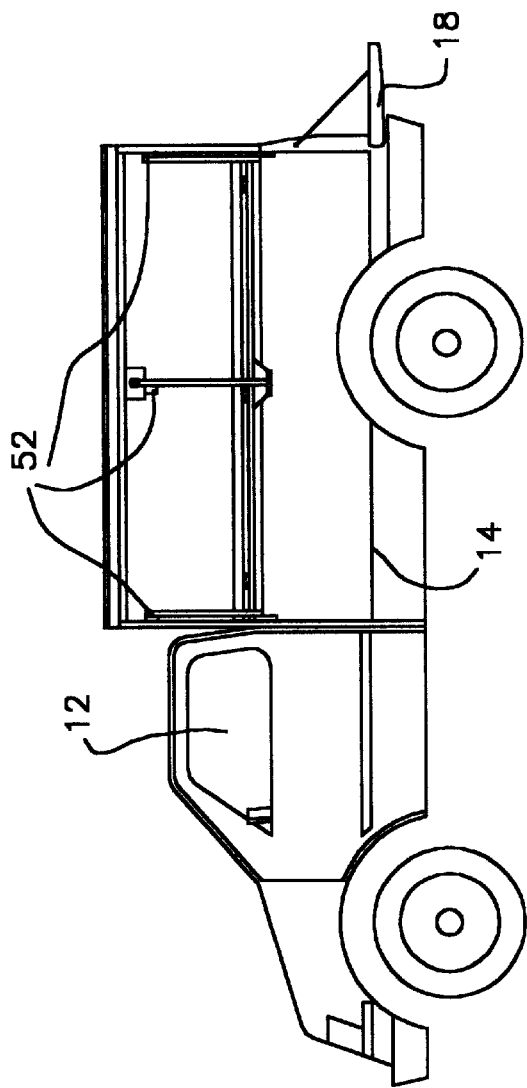
FIG. 9a is a side view of a pickup truck with a cover rigged for driving in an open position.

In one embodiment, as is shown in FIGS. 9a and 9b, cover 30 is used in its open position extending side walls 16 of bed 14. Contained within bottom sides 72 of both restraining lid 32 and captive lid 33 are diagonal braces 84. In one preferred embodiment, lids 32 and 33 have two braces 84. One brace 84 is contained near front edges 64 of lids 32 and 33 and the other brace 84 is contained in near rear edges 66 of lids 32 and 33. An end of each diagonal brace 84 is pivotally connected to lid 32 and 33. Thus each brace 84 may be rotated away from its respective lid 32 or 33. The other end of each diagonal brace 84 preferably includes a quick release fitting (not shown) which allows the brace to be attached to a corresponding fitting on rear member 56 and front member 58.

Braces 84 serve to strengthen and improve the overall stiffness of lid 32 and 33 when in their open position. Moreover, braces 84 serve to keep lids 32 and 33 rigidly in an open position. Use of lids 32 and 33 in an open position allows for certain cargo to be protected.

When used in its open position, in one embodiment, rack bars 86 are provided for cover 30. Preferably three such bars 86 are employed. One bar 86 is used towards rear edges 66 of lids 32 and 33, second bar 86 is used towards front edges 64, and third bar 86 is used between the aforementioned bars 86. Each end of bars 86 attaches to bottom sides 72 of lids 32 and 33, preferably near inboard edges 70 of lids 32 and 33. Rack bars 86 serve to provide additional storage space allowing items to be placed perpendicularly across rack bars 86. For example, cargo such as bicycles, motorcycles, small boats, farm equipment, and ladders may be placed across rack bars 86.

Thus, the cover system in accordance with the present invention allows for many advantages over prior art systems. For example, the hinging system is self aligning allowing for simple and convenient installation. Furthermore, the system is self-adjusting allowing the cover to move fore and aft with relation to the bed. This prevents structural damage caused by the innate and cyclical racking of the truck bed while driving. Therefore the lids need not be fabricated from a material that has high flexibility. In turn, the lids can be fabricated from a stiff, lightweight material. Moreover, lightweight material allows for one gas strut per lid to be used.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

What is claimed is:

1. A cover system for use on a pickup truck bed, said bed having a floor, side walls attached to said floor, said side walls having upper surfaces, a front wall attached to said floor, said front wall having an upper surface, and a tailgate attached to said floor, said cover system comprising:
   a frame having two side members, said side members of said frame attached to said upper surfaces of said side walls such that said frame is attached to said pickup truck bed;
   at least one of said side members further includes a longitudinal pin groove disposed along portions of said side members;
   a removable restraining lid, having a restraining lid outboard edge, a bottom side, and further having at least one hinge pin member fastened to said bottom side at a location proximate said outboard edge such that at least one of said lids further includes a longitudinal receiving member groove disposed along portions of said lids; and
   at least one hinge receiving member disposed on one of said side members of said frame having said longitudinal pin groove, so as to allow said hinge pin members to slidingly engage said hinge receiving member when said restraining lid slides along said pin groove.

2. A cover system as recited in claim 1 further comprising a captive lid having at least one hinge pin member fastened to said bottom side at a location proximate said outboard edge.

3. A cover system as recited in claim 1, said frame further comprising a front member attached to said upper surface of said front wall, and a rear member.

4. A cover system as recited in claim 2 further comprising a plurality of gas struts, each of said gas struts having two ends, one of said ends of at least one of said gas struts pivotally attached to said bottom side of at least one of said lids, said other end of at least one of said gas struts pivotally attached to one of said side members, said gas strut assemblies movable between an open extended position and a closed contracted position, biased toward said open extended position.

5. A cover system as recited in claim 1 wherein at least one of said side members further includes a longitudinal curb disposed along portions of said side members.

6. A cover system as recited in claim 3 wherein said rear frame member is detachably connected to said side members.

7. A cover system as recited in claim 2 wherein said captive of lid further comprise:
   a captive lid channel on said bottom side proximate said outboard edge; and
   a gasket disposed within said channel.

8. A cover system as recited in claim 7 wherein said restraining lid has a restraining lid rim on said bottom side proximate to said outboard edge configured to engage said captive channel.

9. A cover system as recited in claim 8 wherein a gasket is disposed within said rim.

10. A removable cover system as recited in claim 1 wherein said restraining lid is further comprised of a front edge, said front edge of said restraining lid extends beyond said frame.

11. A cover system as recited in claim 8 wherein said lids further comprise a plurality of diagonal braces, said braces pivotally attached to said bottom side of at least one of said of lids, said braces removably attached to brace attachment points disposed on said front member and said rear member of said frame.

12. A cover system for use on a pickup truck bed, said bed having side walls, said side walls having upper inside surfaces, said cover system comprising:
- a frame having two side members, said side members of said frame attached to said upper inside surfaces of said side walls such that said frame is attached to said pickup truck bed;
- at least one of said side members further includes a longitudinal pin groove disposed along portions of said side members;
- a captive lid having a captive lid channel on said bottom side proximate a captive lid outboard edge and a gasket disposed within said channel;
- a restraining lid having a restraining lid rim on said bottom side proximate a restraining lid outboard edge such that said rim matingly engages said channel when said restraining lid and said captive lid are in a closed position and;
- at least one hinge receiving member disposed on one of said side members of said frame having said longitudinal pin groove, so as to allow said hinge pin members to slidingly engage said hinge receiving member when one of said lids slides along said pin groove.

13. A cover system as recited in claim 12 further comprising a gasket disposed along the length of said captive lid channel.

14. A cover system as recited in claim 12 further comprising a gasket disposed along the length of said restraining lid rim.

15. A cover system as recited in claim 12 further comprising a plurality of gas struts, each of said gas struts having two ends, at least one of said ends of each of said gas struts pivotally attached to said bottom side of one of said lids, said other ends of said gas struts pivotally attached to one of said side members, said gas struts movable between an open extended position and a closed contracted position, biased toward said open extended position.

16. a cover system as recited in claim 12 wherein at least one of said side members further includes a longitudinal curb disposed along portions of said side members.

17. A cover system as recited in claim 12 wherein said frame further comprises a rear member detachably connected to said side members.

18. A cover system as recited in claim 12 wherein said captive lid and said restraining lid further comprise:
- a lid channel on said bottom side nearer to said restraining lid and captive lid outboard edges than to a oppositely positioned restraining lid and captive lid inboard edges; and
- a gasket disposed within said channel.

19. A cover system as recited in claim 12 wherein said front edge of said captive lid and said front edge of said restraining lid extend over said frame.

20. A cover system as recited in claim 12 wherein said restraining lid and said captive lid further comprise a plurality of diagonal braces, said braces pivotally attached to said bottom side of said restraining lid and said captive lid, said braces removably attached to brace attachment points disposed on said front member and said rear member.

21. A cover system for use on a pickup truck bed, said bed having side walls, a front wall, a tailgate and a floor, said side walls and said front wall having upper inside surfaces, said cover system comprising:
- a frame having a front member, a rear member, and two side members, said side members of said frame attached to said upper inside surfaces of said side walls such that said frame is attached to said pickup truck bed;
- at least one of said side members further includes a longitudinal pin groove disposed along portions of said side members;
- a captive lid and a restraining lid, each of said captive lid and said restraining lid having a front edge, a rear edge, an outboard edge, an inboard edge, a top side, and a bottom side, said captive lid and said restraining lid coupled to one of said side members, each of said lids rotatable about an axis of rotation, each of said lids positionable between a closed position and an open position;
- at least one hinge receiving member disposed on one of said side members of said frame having said longitudinal pin groove, so as to allow said hinge pin members to slidingly engage said hinge receiving member when one of said lids slides along said pin groove; and
- a latch means between said restraining lid and said frame, said latch means positionable in a secure position and non-secure position.

22. A cover system as recited in claim 21 wherein said latch means comprises:
- a plurality of hooks pivotally attached to said bottom side of said restraining lid, said hooks movable between a secure and unsecure position, said hooks biased towards said secure position;
- a plurality of catches disposed on said front and rear frame members corresponding to said plurality of hooks; and
- such that when said restraining lid is in said closed position, said hooks securely engage said catches.

23. A cover system as recited in claim 22 wherein said latch means further comprises a means which allows for the remote movement of said hooks between said secure and unsecure position.

24. A cover system as recited in claim 23 wherein said means which allows for the remote movement comprises:
- a rotatable handle;
- a linkage having multiple attachment points, said linkage attached to said handle, said linkage attached to said hooks; and
- such that rotation of said handle rotates said linkage, moving said hooks between said unsecure and said secure position.

25. A cover system as recited in claim 21 further comprising a plurality of gas struts, each of said gas struts having two ends, at least one of said ends of each of said gas struts pivotally attached to said bottom side of one of said lids, said other ends of said gas struts pivotally attached to one of said side members, said gas struts movable between an open extended position and a closed contracted position, biased toward said open extended position.

26. a cover system as recited in claim 21 wherein at least one of said side members further includes a longitudinal curb disposed along portions of said side members.

27. A cover system as recited in claim 21 wherein said rear frame member is detachably connected to said side members.

28. A cover system as recited in claim 21 wherein said captive lid and said restraining lid further comprise:

a lid channel on said bottom side nearer to said outboard edge than to said inboard edge; and a gasket disposed within said channel.

29. A cover system as recited in claim 21 wherein said front edge of said captive lid and said front edge of said restraining lid extend over said frame.

30. A cover system as recited in claim 21 wherein said restraining lid and said captive lid further comprise a plurality of diagonal braces, said braces pivotally attached to said bottom side of said restraining lid and said captive lid, said braces removably attached to brace attachment points disposed on said front member and said rear member.

31. A cover system as recited in claim 2 wherein said captive lid and said restraining lid further comprise:

a lid channel on said bottom side nearer to said restraining lid and captive lid outboard edges than to a oppositely positioned restraining lid and captive lid inboard edges; and a gasket disposed within said channel.

32. A cover system as recited in claim 1 further comprising a latch means positionable in a secure position and non secure position.

33. A cover system as recited in claim 1 wherein said frame is further comprised of a front member and a rear member.

* * * * *